(12) United States Patent
Mott et al.

(10) Patent No.: US 8,858,264 B2
(45) Date of Patent: Oct. 14, 2014

(54) ELECTRICAL TERMINAL RETAINER AND RECEPTACLE ASSEMBLY

(71) Applicant: Lear Corporation, Southfield, MI (US)

(72) Inventors: Allen Leo Mott, Livonia, MI (US); Michael Glick, Farmington Hills, MI (US); Slobodan Pavlovic, Novi, MI (US)

(73) Assignee: Lear Corporation, Southfield, MI (US)

( * ) Notice: Subject to any disclaimer, the term of this patent is extended or adjusted under 35 U.S.C. 154(b) by 50 days.

(21) Appl. No.: 13/687,317

(22) Filed: Nov. 28, 2012

(65) Prior Publication Data

US 2014/0148062 A1 May 29, 2014

(51) Int. Cl.
*H01R 4/28* (2006.01)
(52) U.S. Cl.
CPC .................................... *H01R 4/28* (2013.01)
USPC ....................................................... 439/660
(58) Field of Classification Search
USPC ................. 439/660, 841, 843, 578, 877, 135
See application file for complete search history.

(56) References Cited

U.S. PATENT DOCUMENTS

| | | | |
|---|---|---|---|
| 3,161,451 A | 12/1964 | Neidecker | |
| 3,784,965 A | 1/1974 | Murphy | |
| 4,401,359 A | 8/1983 | Frelk | |
| 4,572,606 A | 2/1986 | Neumann et al. | |
| 4,734,063 A | 3/1988 | Koch et al. | |
| 5,106,328 A | 4/1992 | Prochaska et al. | |
| 5,203,813 A | 4/1993 | Fitzsimmons et al. | |
| 5,449,304 A | 9/1995 | Huss, Jr. et al. | |
| 5,474,479 A | 12/1995 | Bennett et al. | |
| 5,588,852 A * | 12/1996 | Puerner | 439/135 |
| 5,591,039 A | 1/1997 | Matthews | |
| 5,667,413 A | 9/1997 | Trafton | |
| 5,676,571 A | 10/1997 | Matthews | |
| 5,730,628 A | 3/1998 | Hawkins | |
| 5,735,716 A | 4/1998 | Bilezikjian | |
| 5,816,643 A | 10/1998 | Itou et al. | |
| 5,921,803 A | 7/1999 | Mori | |
| 6,039,614 A | 3/2000 | Ramari | |
| 6,042,432 A | 3/2000 | Hashizawa et al. | |
| 6,062,919 A | 5/2000 | Trafton | |
| 6,102,746 A | 8/2000 | Nania et al. | |
| 6,250,974 B1 | 6/2001 | Kerek | |
| 6,254,439 B1 * | 7/2001 | Endo et al. | 439/843 |

(Continued)

FOREIGN PATENT DOCUMENTS

| | | |
|---|---|---|
| WO | 2010060370 A1 | 6/2010 |
| WO | 2012151504 A2 | 11/2012 |

*Primary Examiner* — Alexander Gilman
(74) *Attorney, Agent, or Firm* — Brooks Kushman P.C.

(57) ABSTRACT

A retainer is provided to retain an electrically conductive terminal within a receptacle. The retainer has a longitudinal body sized to be received by the receptacle and engage the terminal to retain the terminal within the receptacle. The body has an aperture formed therethrough sized to receive a pin through the aperture to contact the terminal. A shoulder extends transversely from the body to engage a distal end of the receptacle and position the body relative to the receptacle. A fastener extends longitudinally from the shoulder and is spaced apart from the body to fasten the retainer to the receptacle. A receptacle assembly is provided with a barb formed externally on a body. An electrically conductive terminal is received within the receptacle assembly. A retainer is provided on an opening of the receptacle to retain the terminal therein in engagement with the barb to fasten the retainer to the body.

20 Claims, 5 Drawing Sheets

(56) References Cited

U.S. PATENT DOCUMENTS

| | | | |
|---|---|---|---|
| 6,264,508 B1 * | 7/2001 | Lehmann | 439/843 |
| 6,273,766 B1 | 8/2001 | Zennamo, Jr. et al. | |
| 6,464,546 B2 | 10/2002 | LaCoy | |
| 6,482,049 B1 | 11/2002 | Swearingen | |
| 6,752,668 B2 | 6/2004 | Koch, Jr. | |
| 6,811,453 B2 * | 11/2004 | Williams | 439/843 |
| 6,837,756 B2 | 1/2005 | Swearingen et al. | |
| 6,848,922 B2 | 2/2005 | Coughlan et al. | |
| 6,966,802 B2 | 11/2005 | Hielscher et al. | |
| 6,994,600 B2 * | 2/2006 | Coulon | 439/843 |
| 7,048,596 B2 | 5/2006 | Swearingen et al. | |
| 7,191,518 B2 | 3/2007 | Beloritsky et al. | |
| 7,828,609 B2 * | 11/2010 | Li et al. | 439/843 |
| 7,845,992 B2 | 12/2010 | Glick et al. | |
| 7,955,097 B2 * | 6/2011 | O'Leary et al. | 439/114 |
| 8,096,829 B2 * | 1/2012 | Malloy et al. | 439/578 |
| 8,282,429 B2 * | 10/2012 | Glick et al. | 439/843 |
| 8,414,339 B1 * | 4/2013 | Glick et al. | 439/843 |
| 8,425,253 B2 | 4/2013 | Malloy et al. | |
| 8,430,698 B2 | 4/2013 | Stewart et al. | |
| 2003/0040228 A1 * | 2/2003 | Finzer et al. | 439/752 |
| 2003/0077950 A1 | 4/2003 | Swearingen et al. | |
| 2009/0048638 A1 | 2/2009 | Rey et al. | |
| 2009/0298356 A1 | 12/2009 | Li et al. | |
| 2011/0034053 A1 | 2/2011 | Matsumoto et al. | |
| 2011/0171850 A1 | 7/2011 | Brown, II | |
| 2012/0003882 A1 | 1/2012 | Stewart et al. | |
| 2012/0282797 A1 | 11/2012 | Mott et al. | |
| 2012/0282823 A1 * | 11/2012 | Glick et al. | 439/877 |
| 2012/0322322 A1 | 12/2012 | Stewart et al. | |
| 2013/0017739 A1 | 1/2013 | Glick et al. | |
| 2013/0052854 A1 * | 2/2013 | Mott et al. | 439/345 |
| 2013/0109221 A1 | 5/2013 | Glick et al. | |
| 2013/0109237 A1 * | 5/2013 | Glick et al. | 439/625 |
| 2013/0337702 A1 * | 12/2013 | Pavlovic et al. | 439/700 |

* cited by examiner

ELECTRICAL TERMINAL RETAINER AND RECEPTACLE ASSEMBLY

TECHNICAL FIELD

Various embodiments relate to retainers for electrical terminals for facilitating electrical connectivity, and receptacle assemblies comprising electrical terminal retainers.

BACKGROUND

Electrical terminals are utilized in a number of applications to facilitate electrical connectivity between elements. Some electrical terminals may be configured to facilitate use with a removable connector of the type that may be repeatedly inserted and removed or otherwise configured to repeatedly engage and disengage the electrical terminal. The ability of the electrical terminal to facilitate electrical connectivity with such a removable connector can be problematic if an electrical connection area between the terminal and the connector has poor connectivity, particularly when tolerance variations, contamination, or degradation from repeated use causes a mating arrangement between the components to become loose, insecure, or blocked.

SUMMARY

According to at least one embodiment, a retainer is provided to retain an electrically conductive terminal within a receptacle. The retainer has a longitudinal body sized to be received by the receptacle and engage the terminal to retain the terminal within the receptacle. The body has an aperture formed therethrough sized to receive a pin through the aperture to contact the terminal. A shoulder extends transversely from the body to engage a distal end of the receptacle and position the body relative to the receptacle. A fastener extends longitudinally from the shoulder and is spaced apart from the body to fasten the retainer to the receptacle.

According to at least another embodiment, a receptacle assembly is provided with housing having at least one receptacle formed therein. An electrically conductive terminal is received within the receptacle. A retainer is provided on an opening of the receptacle to retain the terminal therein. The retainer has a longitudinal body sized to be received by the receptacle and engage the terminal to retain the terminal within the receptacle. The body has an aperture formed therethrough sized to receive a pin through the aperture to contact the terminal. A shoulder extends transversely from the body to engage a distal end of the receptacle and position the body relative to the receptacle. A fastener extends longitudinally from the shoulder and is spaced apart from the body to fasten the retainer to the receptacle.

According to at least another embodiment, a retainer is provided to retain an electrically conductive terminal within a receptacle. The retainer has a longitudinal body sized to be received by the receptacle and engage the terminal to retain the terminal within the receptacle. The body has an aperture formed therethrough sized to receive a pin through the aperture for contact with the terminal. A shoulder extends transversely from the body to engage a distal end of the receptacle and to position the body relative to the receptacle. A fastener extends longitudinally from the shoulder. The fastener has a length that is greater than a length of the body.

According to at least another embodiment, a receptacle assembly is provided with a housing having a body with at least one receptacle formed therein with an opening at a distal end of the body, with at least one barb formed externally on the body adjacent the distal end. An electrically conductive terminal is received within the receptacle. A retainer is provided on an opening of the receptacle to retain the terminal therein in engagement with the at least one barb to fasten the retainer to the body.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
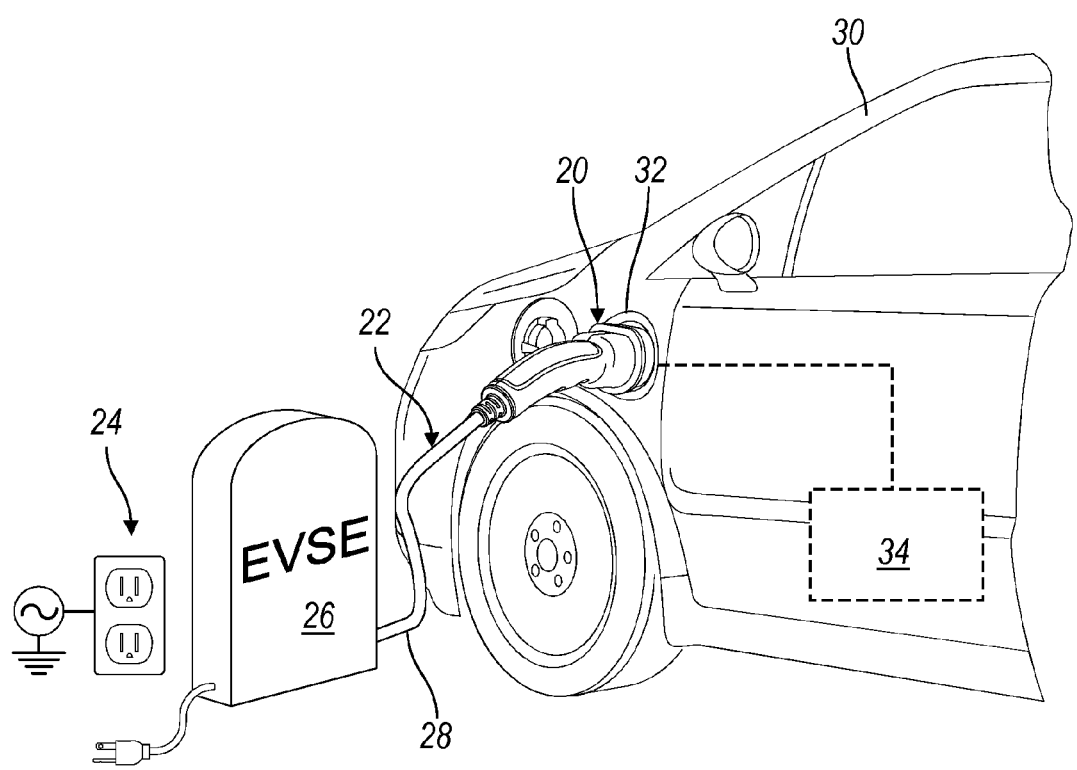
FIG. 1 is a perspective view of a connector assembly according to an embodiment illustrated in cooperation with a vehicle and a power supply.

With reference to FIG. 1, a connector assembly for facilitating electric charging of a vehicle is illustrated in accordance with an embodiment and is referenced generally by numeral 20. In general, the connector assembly 20 may be configured to accommodate a number of different electrical harness configurations by interchanging a couple components.

The connector assembly 20 is included in a cordset assembly 22, according to one or more embodiments. The cordset assembly 22 includes a connector for connecting to an external power supply 24 for receiving electrical energy. The external power supply 24 represents an alternating current (AC) electrical power supply, such as a standard residential power circuit. The cord set assembly 22 includes electric vehicle supply equipment (EVSE) 26 and a charging cable 28. The charging cable 28 extends between the EVSE 26 and the connector assembly 20. The EVSE 26 is configured to monitor electrical energy passing through the cable 28 during charging. The cordset assembly 22 may be configured to be portable (as shown in FIG. 1) or fixed to a charging station (not shown).

The connector assembly 20 attaches to a "plug-in" vehicle 30, such as a hybrid electric vehicle, for supplying electrical energy to the vehicle 30. The vehicle 30 includes a vehicle charging receptacle 32 that is connected to a battery 34 for receiving and storing electrical energy. The vehicle charging receptacle 32 is mounted to be externally accessible from the vehicle 30. The vehicle receptacle 32 receives the connector assembly 20. The battery 34 is electrically connected to the charging receptacle 32 for storing electrical power. The vehicle 30 may also include a converter (not shown) for converting AC to DC electrical power for storage in the battery 34. The vehicle 30 may be an electric vehicle, or any suitable vehicle that receives external electric power.

Figure 2:
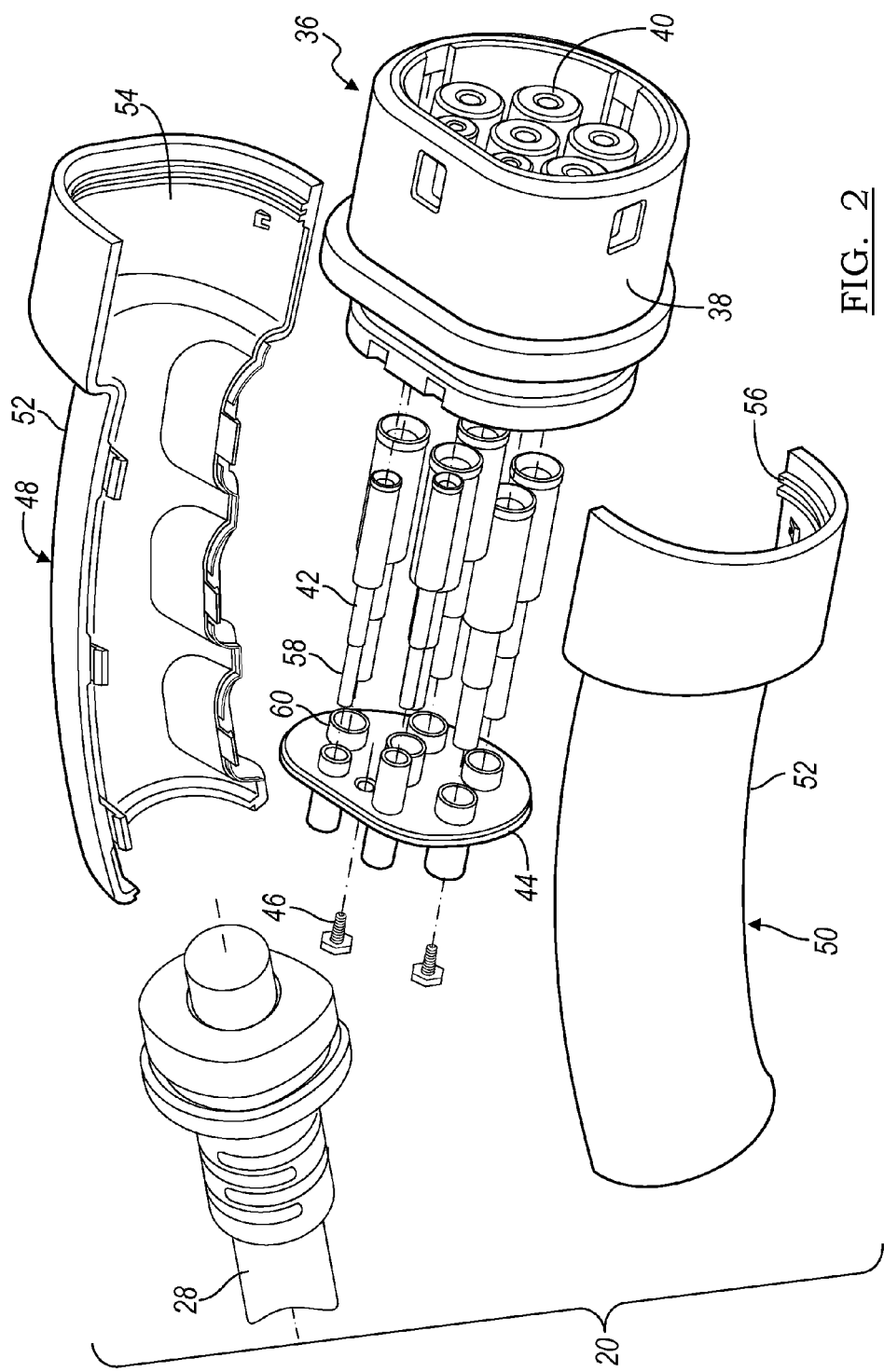
FIG. 2 is an exploded perspective view of the connector assembly of FIG. 1.

Referring now to FIG. 2, the connector assembly 20 is illustrated exploded for revealing the various components. The connector assembly 20 includes a first housing portion 36 that has an external plug 38 that is sized to be received within the vehicle charging receptacle 32. The first housing portion 36 includes a plurality of recessed sockets 40 that are each sized to receive an electrical connector, such as a receptacle assembly 42. The receptacle assemblies 42 are female electrical connectors that are inserted into the sockets 40 and retained into the sockets 40 by a backing plate 44 that is fastened to the first housing portion 36 by fasteners 46.

The receptacles 42 receive a plurality of pins (not shown) that are recessed within the vehicle charging receptacle 32 as is known in the art. By inserting the plug 38 into the vehicle charging receptacle 32, the receptacle assemblies 42 are aligned with the pins, the pins are received within the sockets 40 and consequently the receptacle assemblies 42, thereby making electrical connection between the cordset assembly 22 and the vehicle 30. Although female receptacle assemblies 42 are illustrated and described, the invention contemplates any conductive connectors for the connector assembly 20. Alternatively, the sockets 40 may retain male pin connectors.

The connector assembly 20 includes a second housing portion 48 and a third housing portion 50. The second housing portion 48 and the third housing portion 50 are similar, yet mirror images of each other, for assembly in a clamshell configuration for retaining the cable 28 and the first housing portion 36. Once assembled, the housing portions 36, 48, 50 collectively provide a handle for manual manipulation of the connector assembly 20. The second and third housing portions 48, 50 collectively provide an exterior 52 for the connector assembly 20 and each include a cavity 54, 56. Wires 58 extend from the cable 28 within the cavity 54, 56, through apertures 60; and are connected to the receptacle assemblies 42.

Figure 3:
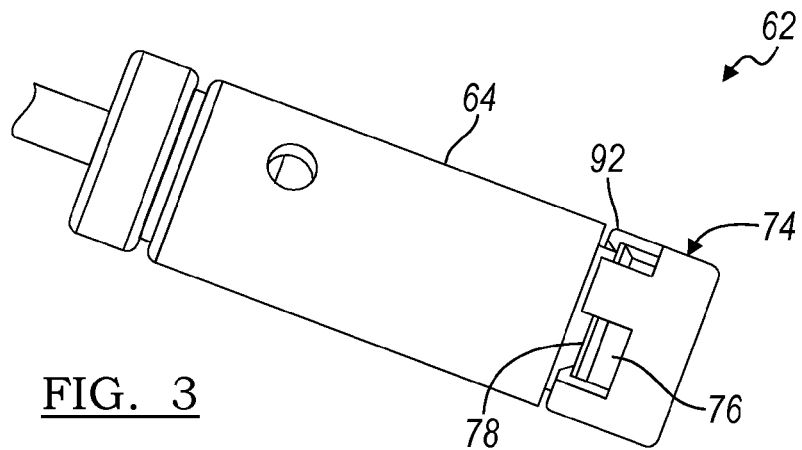
FIG. 3 is a perspective view of a receptacle assembly of the connector assembly of FIG. 1 according to an embodiment.
Figure 4:
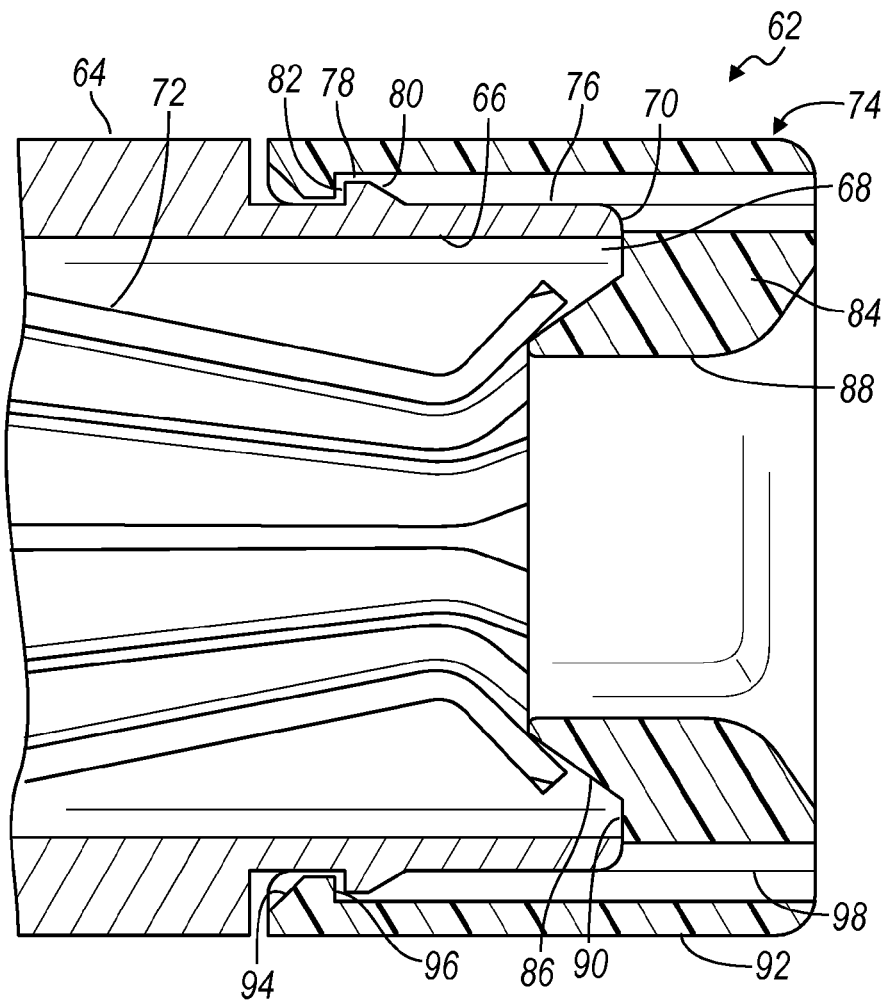
FIG. 4 is an enlarged partial section view of a distal end of the receptacle assembly of FIG. 3.

Referring now to FIGS. 3 and 4, a receptacle assembly 62 is illustrated for use with the connector assembly 20. The receptacle assembly 62 includes a longitudinal housing 64 formed from an electrically conductive material with a receptacle 66 (FIG. 4) formed therein. The receptacle 66 includes an opening 68 at a distal end 70 of the housing 64. An electrically conductive terminal 72 is received within the receptacle 66. A retainer 74 retains the terminal 72 within the receptacle 66.

The receptacle housing 64 may have a reduced outer diameter portion 76 adjacent the distal end 70 for receipt of the retainer 74 without increasing an overall diameter of the receptacle assembly 62. The reduced diameter portion 76 may be provided with a radially outboard retention ring 78 formed thereabout, including an inclined surface 80 extending away from the distal end 70, and an abutment surface 82 facing away from the distal end 70. The reduced diameter portion 76 with the retention ring 78 may be formed by machining, which may be relatively easy to manufacture due to the external orientation relative to the housing 64.

The retainer 74 includes a longitudinal guide body 84 with a tapered portion 86 extending partially into the receptacle 66 for retention and alignment of the terminal 72. An aperture 88 is formed through the guide body 84 to receive and guide a pin into engagement with the terminal 72. A shoulder 90 extends transversely from the guide body 84 to engage the distal end 70 of the receptacle housing 64. The engagement of the shoulder 90 upon the distal end 70 provides a locator for the guide body 84 and consequently the terminal 72 thereby minimizing overall tolerance totals, commonly referred to as tolerance stack-up. The retainer 74 may be formed from an insulative material or a conductive material, as is known in the art.

The retainer 74 also includes a radial array of fasteners 92 each extending longitudinally from the shoulder 90 and spaced apart from the guide body 84. The fasteners 92 each extend a length greater than a length of the guide body 84 for engagement with the retention ring 78. Each fastener 92 is a beam extending from the shoulder 90 with a leading edge 94 facing away from the guide body 84 and an abutment surface 96 facing the shoulder 90, commonly referred to as a snap finger. During installation, the leading edges 94 engage the inclined surface 80 of the retention ring 78. The fasteners 92 are spaced apart angularly so that the beams 92 deflect divergently until the fastener abutment surfaces 96 pass the inclined surface 80 of the retention ring 78. The beams 92 retract thereby engaging the abutment surfaces 96 of the fasteners 92 with the abutment surface 82 of the retention ring 78 for securing the retainer 74 to the longitudinal housing 64. Apertures 98 may be provided within the shoulder 90 adjacent the beams 92 for enhancing flexibility of the beams 92.

With the receptacle assembly 62, any loose flash formed upon the fasteners 92, or caused during assembly, is external of the receptacle assembly 62 and therefore does not affect an electrical connection within the receptacle assembly 62. Additionally, the design of another retainer, or replacement of the retainer can be provided by extending the beams 92.

Figure 5:
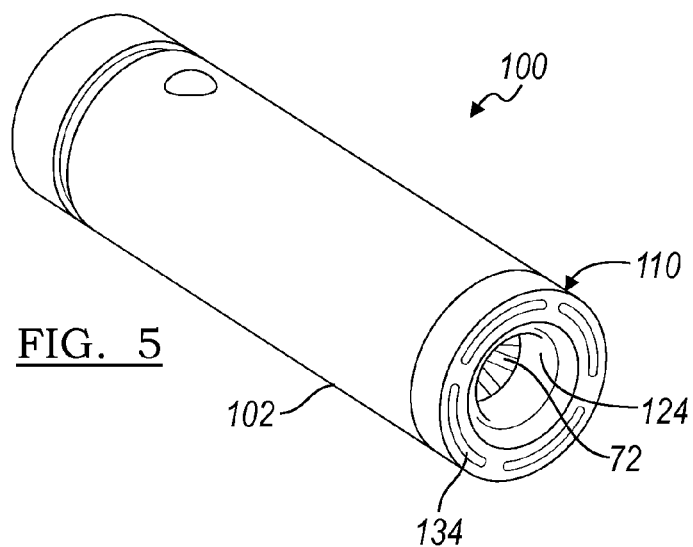
FIG. 5 is a perspective view of a receptacle assembly of the connector assembly of FIG. 1 according to an embodiment.
Figure 6:
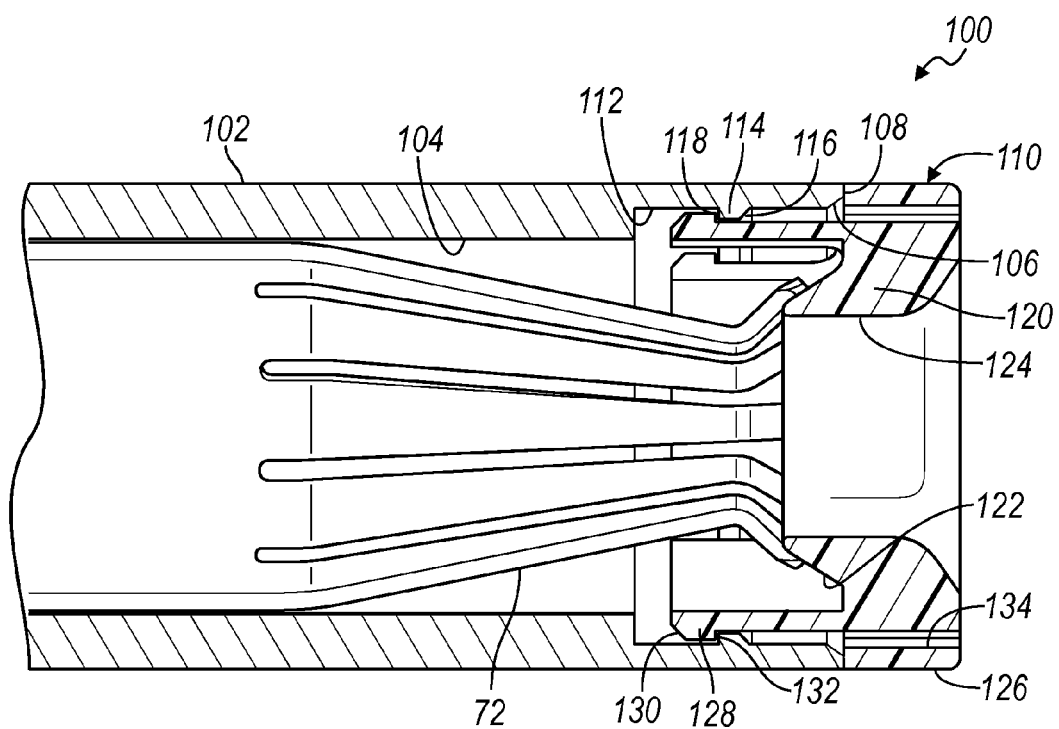
FIG. 6 is an enlarged partial section view of a distal end of the receptacle assembly of FIG. 5.

FIGS. 5 and 6 illustrate another receptacle assembly 100 is illustrated for use with the connector assembly 20. The receptacle assembly 100 includes a longitudinal housing 102 formed from an electrically conductive material with a receptacle 104 (FIG. 6) formed therein. The receptacle 104 includes an opening 106 at a distal end 108 of the housing 102. An electrically conductive terminal 72 is received within the receptacle 104. A retainer 110 retains the terminal 72 within the receptacle 104.

The receptacle housing 102 may have an enlarged inner diameter portion 112 adjacent the distal end 108 for receipt of the retainer 110 without increasing an overall diameter of the receptacle assembly 100. The enlarged inner diameter portion 112 may be provided with a radially inboard retention ring 114 formed therein, including an inclined surface 116 extending away from the distal end 108, and an abutment surface 118 facing away from the distal end 108. The enlarged inner diameter portion 112 with the retention ring 114 may be formed by machining The retainer 110 includes a longitudinal guide body 120 with a tapered portion 122 extending partially into the receptacle 104 for retention and alignment of the terminal 72. An aperture 124 is formed through the guide body 120 to receive and guide a pin into engagement with the terminal 72. A shoulder 126 extends transversely from the guide body 120 to engage the distal end 108 of the receptacle housing 102. The engagement of the shoulder 126 upon the distal end 108 provides a locator for the guide body 120 and consequently the terminal 72 thereby minimizing overall tolerance totals, commonly referred to as tolerance stack-up.

The retainer 110 also includes a radial array of fasteners 128 each extending longitudinally from the shoulder 126 and spaced apart from the guide body 120. The fasteners 128 each extend a length greater than a length of the guide body 120 for engagement with the retention ring 114. Each fastener 128 is a beam extending from the shoulder 126 with a leading edge 130 facing away from the guide body 120 and an abutment surface 132 facing the shoulder 126. During installation, the leading edges 130 engage the inclined surface 116 of the retention ring 114. The fasteners 128 are spaced apart angularly so that the beams 128 deflect convergently until the fastener abutment surfaces 132 pass the inclined surface 116 of the retention ring 114. The beams 128 retract thereby engaging the abutment surfaces 132 of the fasteners 128 with the abutment surface 118 of the retention ring 114 for securing the retainer 110 to the longitudinal housing 102. Apertures 134 may be provided within the shoulder 126 adjacent the beams 128 for enhancing flexibility of the beams 128.

With the receptacle assembly 100, large width fasteners 128 may be employed with relatively thin thicknesses. Additionally, the design of another retainer, or replacement retainer can be provided by extending the beams 128.

Figure 7:
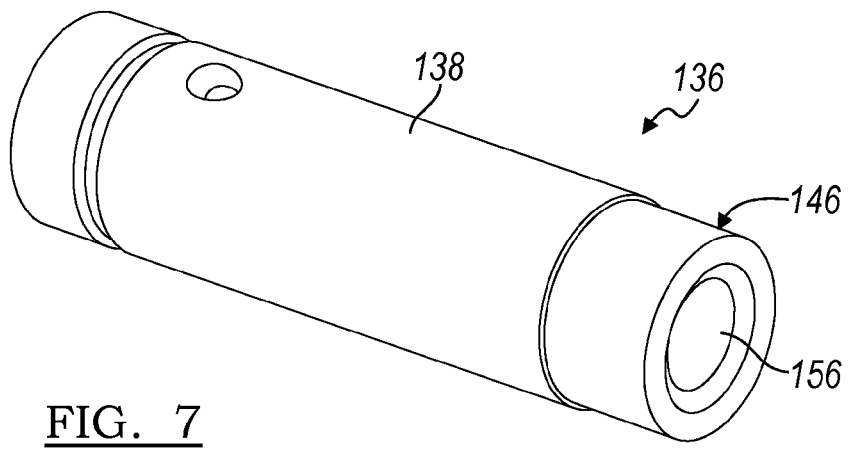
FIG. 7 is a perspective view of a receptacle assembly of the connector assembly of FIG. 1 according to an embodiment.
Figure 8:
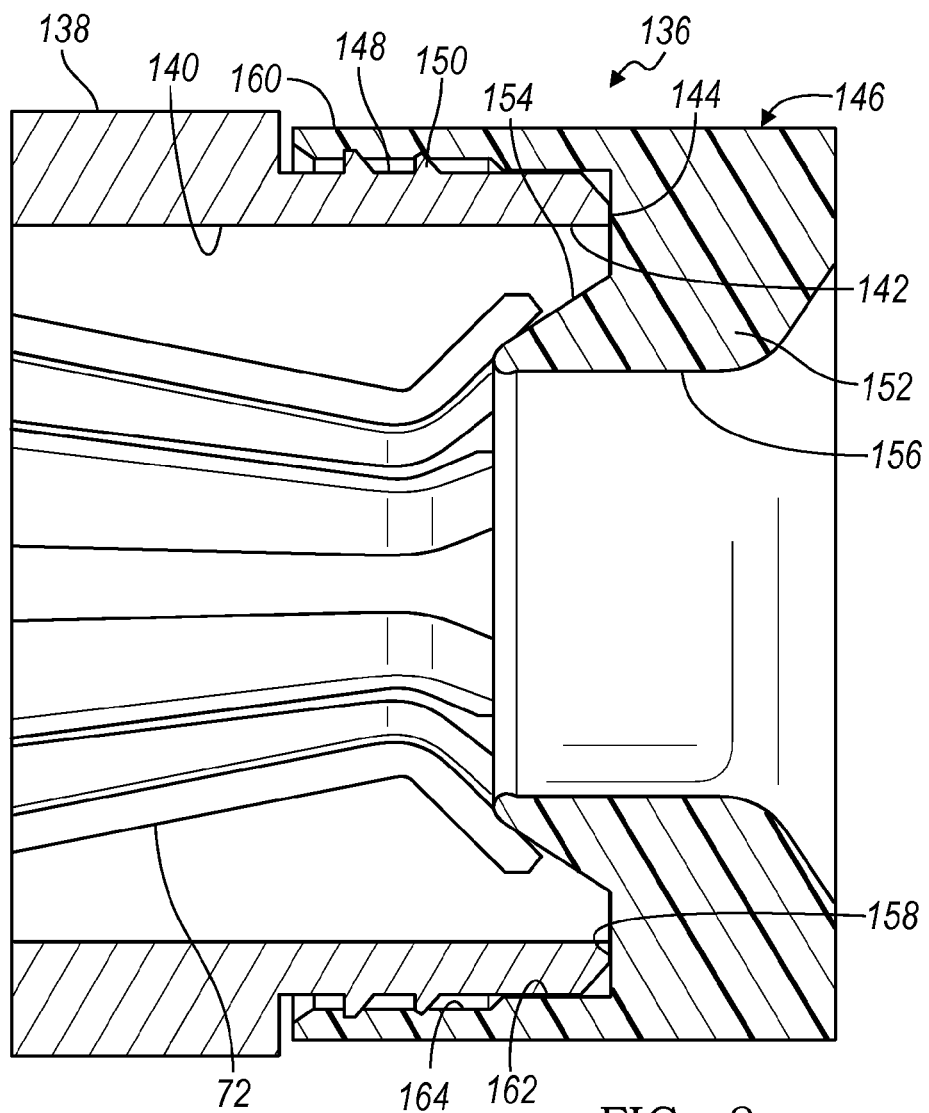
FIG. 8 is an enlarged partial section view of a distal end of the receptacle assembly of FIG. 7.

With reference to FIGS. 7 and 8, a receptacle assembly 136 is illustrated for use with the connector assembly 20. The receptacle assembly 136 includes a longitudinal housing 138 formed from an electrically conductive material with a receptacle 140 (FIG. 8) formed therein. The receptacle 140 includes an opening 142 at a distal end 144 of the housing 138. An electrically conductive terminal 72 is received within the receptacle 140. A retainer 146 retains the terminal 72 within the receptacle 140.

The receptacle housing 138 may have a reduced outer diameter portion 148 adjacent the distal end 144 for receipt of the retainer 146 without increasing an overall diameter of the receptacle assembly 136. The reduced diameter portion 148 may be provided with a plurality of radially outboard barbs 150 formed thereabout. The reduced diameter portion 148 with the barbs 150 may be formed by machining, which may be relatively easy to manufacture due to the external orientation relative to the housing 138.

The retainer 146 includes a longitudinal guide body 152 with a tapered portion 154 extending partially into the receptacle 140 for retention and alignment of the terminal 72. An aperture 156 is formed through the guide body 152 to receive and guide a pin into engagement with the terminal 72. A shoulder 158 extends transversely from the guide body 152 to engage the distal end 144 of the receptacle housing 138. The engagement of the shoulder 158 upon the distal end 144 provides a locator for the guide body 152 and consequently the terminal 72 thereby minimizing overall tolerance totals, commonly referred to as tolerance stack-up. The retainer 146 may be formed from an insulative material or a conductive material, as is known in the art.

The retainer 146 also includes a cylindrical fastener sleeve 160 extending longitudinally from the shoulder 158 and spaced apart from the guide body 152. The sleeve 160 extends a length greater than a length of the guide body 152 for engagement with the barbs 150. According to one embodiment, the sleeve 160 is undersized relative to the outer diameter portion 148 to provide an interference fit for retention of the retainer 146 upon the housing 138 which is secured by the barbs 150. According to another embodiment the sleeve 160 is oversized relative to the outer diameter portion 148 to provide a clearance fit for retention by the barbs 150. Alternatively, the sleeve 160 may have a first inner diameter portion 162 sized for an interference fit upon the outer diameter portion 148 of the housing 138, and a second inner diameter portion 164 sized to clear the outer diameter portion 148 of the housing 138 while engaging and being fastened upon the barbs 150.

With the receptacle assembly 136, any loose flash formed upon the barbs 150, or caused during assembly, is external of the receptacle assembly 136 and therefore does not affect an electrical connection within the receptacle assembly 136.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A retainer to retain an electrically conductive terminal within a receptacle, the retainer comprising:
    a longitudinal body sized to be received by the receptacle and engage the terminal to retain the terminal within the receptacle, the body having an aperture formed therethrough sized to receive a pin through the aperture to contact the terminal;
    a shoulder extending transversely from the body to engage a distal end of the receptacle and to position the body relative to the receptacle; and
    a fastener extending longitudinally from the shoulder and spaced apart from the body to fasten the retainer to the receptacle;
    wherein the fastener comprises a radial array of fasteners.

2. The retainer of claim 1 wherein the fastener is generally cylindrical.

3. The retainer of claim 1 wherein the fastener has a length that is greater than a length of the body.

4. The retainer of claim 1 wherein the radial array of fasteners are spaced apart angularly.

5. The retainer of claim 1 wherein the fastener comprises an abutment surface to engage a corresponding abutment surface of the receptacle.

6. The retainer of claim 5 wherein the fastener comprises an inclined leading edge adjacent to the fastener abutment surface to deflect the fastener abutment surface during assembly.

7. The retainer of claim 5 wherein the fastener abutment surface is oriented within the aperture.

8. The retainer of claim 5 wherein the fastener abutment surface extends laterally outboard from the fastener.

9. A receptacle assembly comprising:
    a housing having at least one receptacle formed therein;
    an electrically conductive terminal received within the receptacle; and
    a retainer according to claim 1 provided on an opening of the receptacle to retain the terminal therein.

10. The receptacle assembly of claim 9 wherein the housing comprises a body having a distal end with the opening formed therein.

11. The receptacle assembly of claim 10 wherein the receptacle body comprises an abutment surface; and
    wherein the fastener comprises an abutment surface to engage the abutment surface of the receptacle.

12. The receptacle assembly of claim 11 wherein the receptacle body abutment surface extends radially outboard.

13. The receptacle assembly of claim 11 wherein the receptacle body abutment surface extends radially inboard.

14. A receptacle assembly comprising:
    a housing having a body with at least one receptacle formed therein with an opening at a distal end of the body, with at least one barb formed externally on the body adjacent the distal end;
    an electrically conductive terminal received within the receptacle; and
    a retainer provided on an opening of the receptacle to retain the terminal therein in engagement with the at least one barb to fasten the retainer to the body.

15. The receptacle assembly of claim 14 wherein the body distal end is sized to be received within the retainer with an interference fit to fasten the fastener to the body.

16. The receptacle assembly of claim 14 wherein the retainer comprises:
- a longitudinal body sized to be received by the receptacle and engage the terminal to retain the terminal within the receptacle, the body having an aperture formed therethrough sized to receive a pin through the aperture for contact with the terminal;
- a shoulder extending transversely from the body engaging the distal end of the receptacle and positioning the body relative to the receptacle; and
- a fastener extending longitudinally from the shoulder in engagement with the receptacle body.

17. The receptacle assembly of claim 14 wherein the retainer extends over the at least one barb.

18. A retainer to retain an electrically conductive terminal within a receptacle, the retainer comprising:
- a longitudinal body sized to be received by the receptacle and engage the terminal to retain the terminal within the receptacle, the body having an aperture formed therethrough sized to receive a pin through the aperture to contact the terminal;
- a shoulder extending transversely from the body to engage a distal end of the receptacle and to position the body relative to the receptacle; and
- a fastener extending longitudinally from the shoulder and spaced apart from the body to fasten the retainer to the receptacle;
- wherein the fastener comprises an abutment surface to engage a corresponding abutment surface of the receptacle; and
- wherein the fastener further comprises an inclined leading edge adjacent to the fastener abutment surface to deflect the fastener abutment surface during assembly.

19. The retainer of claim 18 wherein the fastener abutment surface is oriented within the aperture.

20. The retainer of claim 18 wherein the fastener abutment surface extends laterally outboard from the fastener.

* * * * *